(12) United States Patent
Shibata et al.

(10) Patent No.: US 8,621,844 B2
(45) Date of Patent: Jan. 7, 2014

(54) SYSTEM AND METHOD FOR CONTROLLING FUEL DELIVERY BASED ON OUTPUT FROM A POST-CATALYST OXYGEN SENSOR DURING CATALYST LIGHT-OFF

(75) Inventors: Jonathan T. Shibata, Whitmore Lake, MI (US); Joshua Cowgill, Hartland, MI (US)

(73) Assignee: GM Global Technology Operations LLC

( * ) Notice: Subject to any disclaimer, the term of this patent is extended or adjusted under 35 U.S.C. 154(b) by 303 days.

(21) Appl. No.: 13/105,336

(22) Filed: May 11, 2011

(65) Prior Publication Data

US 2012/0285142 A1 Nov. 15, 2012

(51) Int. Cl.
*F01N 3/00* (2006.01)
(52) U.S. Cl.
USPC .......... 60/285; 60/274; 60/276; 60/284
(58) Field of Classification Search
USPC ............ 60/274, 276, 284, 285, 286
See application file for complete search history.

(56) References Cited

U.S. PATENT DOCUMENTS

| | | | | |
|---|---|---|---|---|
| 6,532,734 B1 * | 3/2003 | Shane et al. | | 60/277 |
| 6,637,194 B2 * | 10/2003 | Kakuyama et al. | | 60/285 |
| 6,828,156 B2 * | 12/2004 | Ohsuga et al. | | 436/135 |
| 7,198,952 B2 * | 4/2007 | Uchida et al. | | 436/37 |
| 7,257,944 B2 * | 8/2007 | Lewis et al. | | 60/285 |
| 7,918,085 B2 * | 4/2011 | Yoshioka | | 60/286 |

* cited by examiner

*Primary Examiner* — Binh Q Tran (57) ABSTRACT

A system includes a voltage determination module and a fuel control module. The voltage determination module determines a first output voltage of a first oxygen sensor position upstream from a catalyst in an exhaust system of an engine, and determines a second output voltage from a second oxygen sensor positioned downstream from the catalyst, the first output voltage indicating a first oxygen level of exhaust upstream from the catalyst, the second output voltage indicating a second oxygen level of exhaust downstream from the catalyst. The fuel control module controls a fuel mass injected into the engine based on the first output voltage and the second output voltage when a temperature of the catalyst is greater than a light-off temperature, and controls the fuel mass based on the second output voltage and independent from the first output voltage when the catalyst temperature is less than light-off temperature.

20 Claims, 5 Drawing Sheets

SYSTEM AND METHOD FOR CONTROLLING FUEL DELIVERY BASED ON OUTPUT FROM A POST-CATALYST OXYGEN SENSOR DURING CATALYST LIGHT-OFF

FIELD

The present disclosure relates to systems and methods for controlling fuel delivery based on output from a post-catalyst oxygen sensor during catalyst light-off.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When an engine is initially started, a catalyst in an exhaust system of the engine may be heated to a light-off temperature to maximize the ability of the catalyst to reduce emissions. The period during which the catalyst is heated may be referred to as catalyst light-off. During catalyst light-off, an engine may be controlled to produce exhaust having a lean air/fuel ratio to heat the catalyst to the light-off temperature.

During normal operation, the engine may be controlled to maintain an air/fuel ratio of the engine at a stoichiometric ratio. The air/fuel ratio of the engine may be controlled based on output from an oxygen sensor positioned upstream from the catalyst. However, when the engine is initially started, the output from the oxygen sensor may not be reliable until the oxygen sensor is heated to an activation temperature. Thus, the air/fuel ratio of the engine may be controlled based on other engine operating conditions, such as intake airflow, when the engine is initially started.

SUMMARY

A system includes a voltage determination module and a fuel control module. The voltage determination module determines a first output voltage of a first oxygen sensor position upstream from a catalyst in an exhaust system of an engine, and determines a second output voltage from a second oxygen sensor positioned downstream from the catalyst, the first output voltage indicating a first oxygen level of exhaust upstream from the catalyst, the second output voltage indicating a second oxygen level of exhaust downstream from the catalyst. The fuel control module controls a fuel mass injected into the engine based on the first output voltage and the second output voltage when a temperature of the catalyst is greater than a light-off temperature, and controls the fuel mass based on the second output voltage and independent from the first output voltage when the catalyst temperature is less than light-off temperature.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

During catalyst light-off, an air/fuel ratio of an engine may be adjusted to rich to ensure that the engine does not produce nitrogen oxide. In addition, air may be injected into exhaust from the engine using a secondary air injection system to adjust an exhaust air/fuel ratio to lean and thereby heat a catalyst to a light-off temperature. When the exhaust air/fuel ratio is lean, oxygen levels in the exhaust are greater than when the exhaust air/fuel ratio is stoichiometric or rich. Thus, the catalyst may become saturated with oxygen, and the ability of the catalyst to store oxygen may be decreased.

In order to reduce emissions most effectively, the catalyst may be able to release and store oxygen. For example, the catalyst may be able to release oxygen to convert carbon monoxide into carbon dioxide, and the catalyst may be able to store oxygen to convert nitrogen oxide into nitrogen. Therefore, before catalyst light-off ends, the exhaust air/fuel ratio may be set to rich to avoid saturating the catalyst with oxygen.

However, during catalyst light-off, the air/fuel ratio of the engine may not be controlled based on output from an oxygen sensor in an exhaust system of the engine. In turn, the exhaust air/fuel ratio may not be controlled as accurately as desired, and the ability of the catalyst to release and/or store oxygen may be impaired. Therefore, as catalyst light-off ends, the catalyst may not reduce emissions as effectively as possible.

An engine control system and method according to the principles of the present disclosure controls the air/fuel ratio of an engine during catalyst light-off based on output from an oxygen sensor measuring oxygen levels in exhaust from the engine. The oxygen sensor may be a narrow band sensor positioned downstream from a catalyst in an exhaust system of the engine. The exhaust system may include a secondary air injection system that injects air into the exhaust to heat the catalyst. Before catalyst light-off ends, the engine may be controlled to produce exhaust having a rich air/fuel ratio at the catalyst in order to avoid saturating the catalyst with oxygen.

Controlling an air/fuel ratio of an engine based on output from an oxygen sensor measuring oxygen levels in exhaust from the engine enables accurate control of an exhaust air/fuel ratio. Controlling an air/fuel ratio of an engine based on output from an oxygen sensor positioned downstream from the catalyst enables accurate control of the exhaust air/fuel ratio at or near the catalyst. Thus, the amount of oxygen stored in the catalyst may be accurately controlled and optimized to maximize the ability of the catalyst to reduce emissions by releasing and storing oxygen.

Wideband sensors are typically used to determine a value of the air/fuel ratio of exhaust, while narrow band sensors are typically used to determine when the air/fuel ratio of exhaust switches from rich or lean or vice versa. However, the output voltage from a narrow band sensor may provide a qualitative measure of the air/fuel ratio of the exhaust, and narrow band sensors are typically less expensive than wideband sensors. Thus, by controlling an air/fuel ratio of an engine based on output from a narrow band sensor positioned downstream from a catalyst, the amount of oxygen stored in the catalyst may be accurately controlled and optimized at a relatively low cost.

Figure 1:
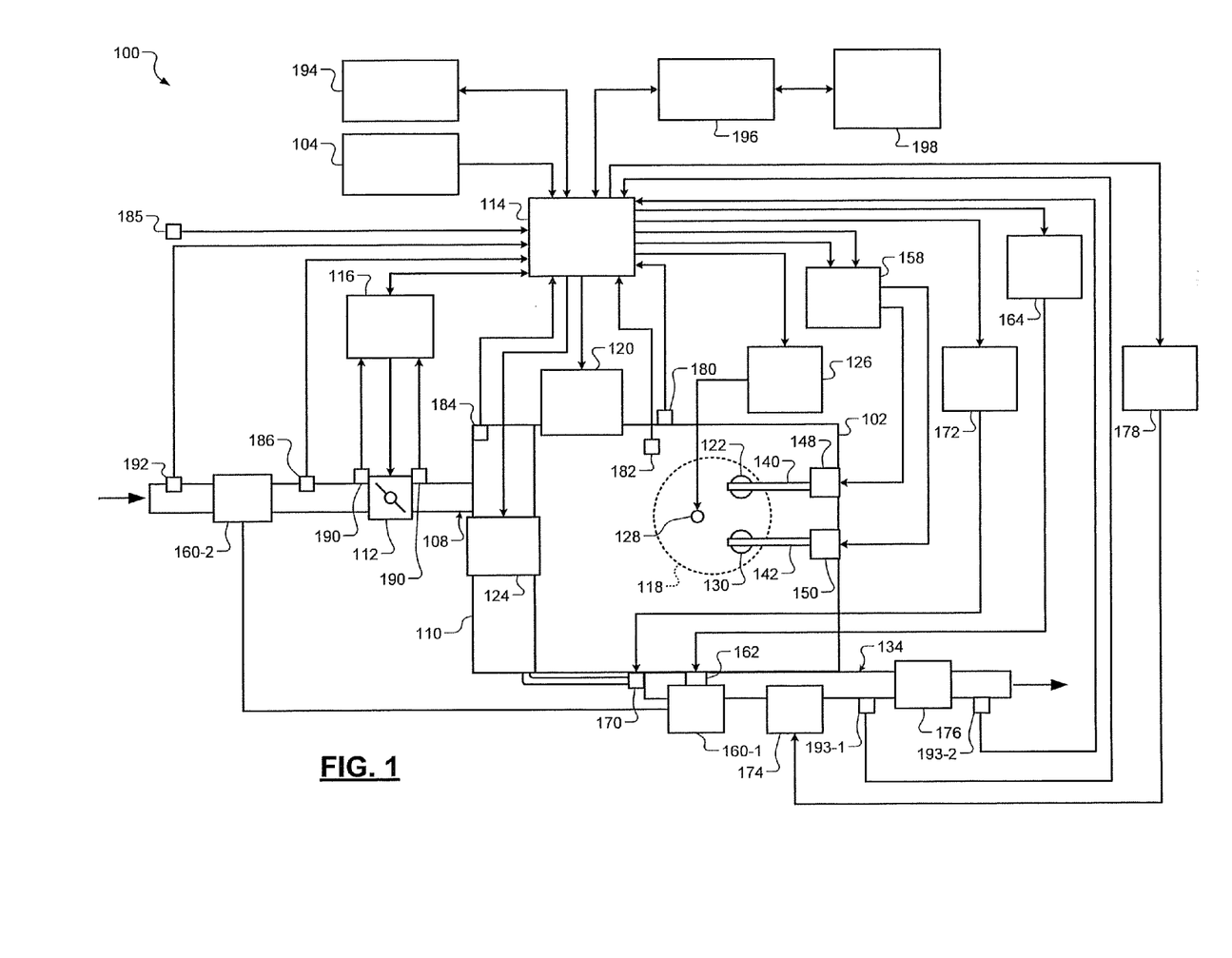
FIG. 1 is a functional block diagram of an example engine system according to the principles of the present disclosure.

Referring now to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, which compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The exhaust system 134 may include a secondary air injection system 174 and a catalyst 176. The secondary air injection (AIR) system 174 injects air into exhaust from the engine 102 to heat the catalyst 176 to the light-off temperature during catalyst light-off after the engine 102 is started. The AIR system 174 may be controlled by an AIR actuator module 178. The catalyst 176 reacts with the exhaust to reduce emissions and operates most effectively when heated to the light-off temperature.

The engine system 100 may measure the speed of the crankshaft (i.e., the engine speed) in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. Ambient air pressure may be measured using an ambient air pressure (AAP) sensor 185. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. Oxygen levels in exhaust from the engine 102 may be measured using a pre-catalyst or upstream oxygen (UO2) sensor 193-1 and a post-catalyst or downstream oxygen (DO2) sensor 193-2. The UO2 sensor 193-1 may be a wideband or narrow-band sensor positioned upstream from the catalyst 176. The DO2 sensor 193-2 may be a wideband or narrow-band sensor positioned downstream from the catalyst 176. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

The ECM 114 controls the fueling rate based on an output voltage from the DO2 sensor 193-2 during catalyst light-off to optimize the amount of oxygen stored in the catalyst 176. The ECM 114 may increase the fueling rate when the output voltage is less than a target voltage, indicating that the air/fuel ratio of exhaust flowing through the catalyst 176 is lean. The ECM 114 may decrease the fueling rate when the output voltage is greater than the target voltage, indicating that the air/fuel ratio of exhaust flowing through the catalyst 176 is rich. The ECM 114 may adjust the fueling rate by an amount that is determined based on a difference between the output voltage and the target voltage, for example, using proportion, integral, and/or derivative control.

Figure 2:
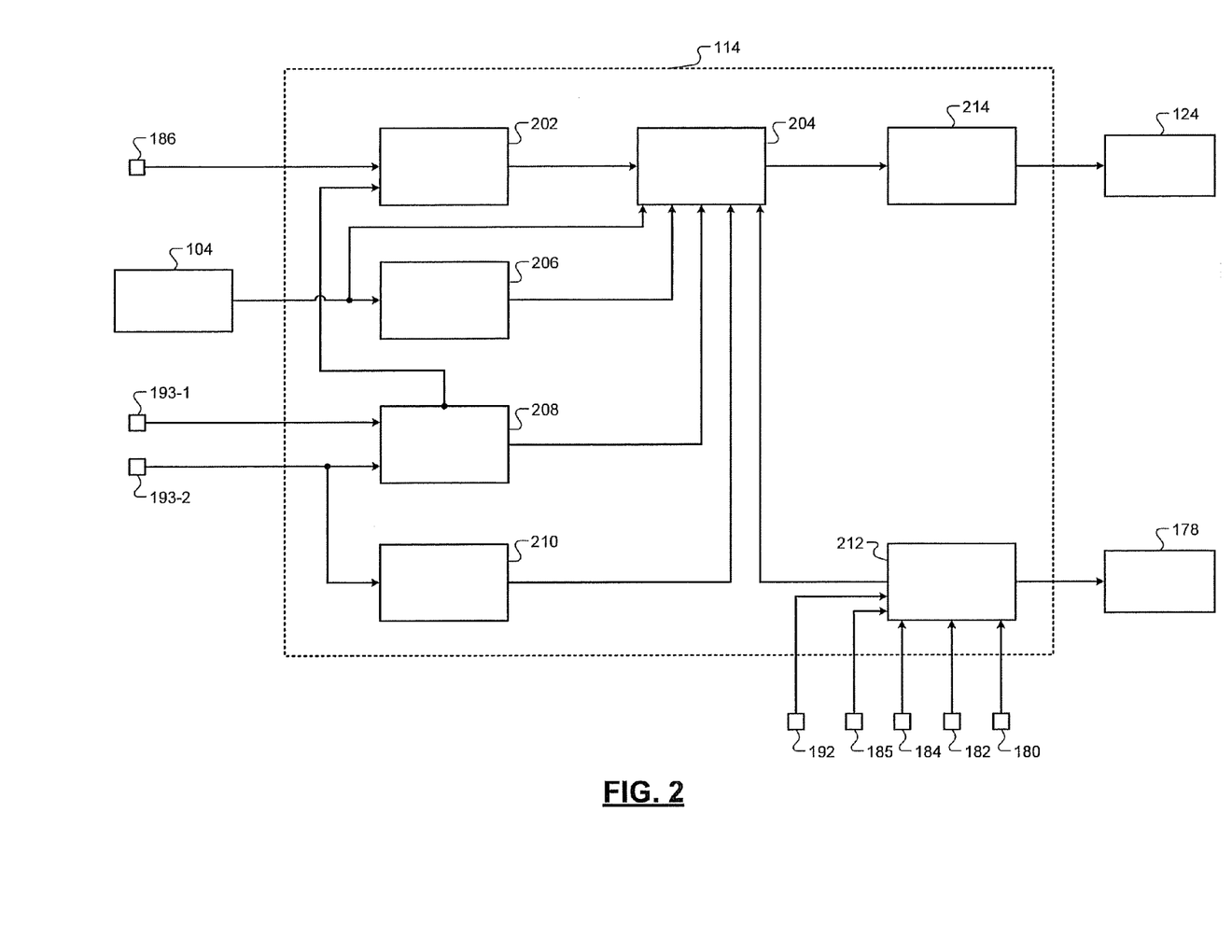
FIG. 2 is a functional block diagram of an example engine control system according to the principles of the present disclosure.

Referring now to FIG. 2, the ECM 114 includes a fuel mass determination module 202 that determines and outputs a fuel mass injected per combustion event. The fuel mass determination module 202 may determine the fuel mass based on the intake airflow, a desired air/fuel ratio, such as stoichiometric, and a predetermined relationship between the intake airflow, the desired air/fuel ratio, and the fuel mass. This predetermined relationship may be embodied in an equation and/or a lookup table.

The fuel mass determination module 202 may estimate the amount of unburned fuel per combustion event based on the engine coolant temperature and properties of a worst-case fuel. The worst-case fuel may have a low volatility in cold temperatures relative to a best-case fuel. The fuel mass determination module 202 may increase the fuel mass to compensate for potential reductions in the air/fuel ratio due to the unburned fuel amount. Also, the AIR system 174 may be positioned at or near the exhaust valve 130. Thus, the fuel mass determination module 202 may estimate airflow delivered by the AIR system 174, and may increase the fuel mass to compensate for potential reductions in the air/fuel ratio due to air injected by the AIR system 174.

When the engine 102 is started, the ECM 114 may operate in an open-loop mode in which the air/fuel ratio of the engine 102 is controlled independent from the oxygen levels measured by the UO2 sensor 193-1. However, during normal operation, the ECM 114 may operate in a closed-loop mode in which the air/fuel ratio of the engine 102 is controlled based on the oxygen levels measured by the UO2 sensor 193-1. Thus, in the open-loop mode, the fuel mass determination module 202 may determine the fuel mass based on the intake airflow and the desired air/fuel ratio, as discussed above. Additionally, in the closed-loop mode, the fuel mass determination module 202 may determine the fuel mass based on the oxygen levels from the UO2 sensor 193-1.

A fuel mass adjustment module 204 adjusts the fuel mass during catalyst light-off based on the output voltage from the DO2 sensor 193-2. The fuel mass adjustment module 204 may adjust the fuel mass based on a predetermined relationship between the output voltage and the air/fuel ratio at the catalyst 176. This predetermined relationship may be embodied in a graph, an equation, and/or a lookup table. The fuel mass adjustment module 204 outputs the fuel mass, as adjusted.

The fuel mass adjustment module 204 may adjust the fuel mass to maintain the air/fuel ratio of exhaust at the catalyst 176 at a desired air/fuel ratio, such as stoichiometric, and thereby optimize the amount of oxygen stored in the catalyst 176. The fuel mass adjustment module 204 may adjust the fuel mass based on the output voltage from the DO2 sensor 193-2 and a target voltage. The target voltage may be a value (e.g., 720 millivolts (mV)) or a range (e.g., 200 mV to 750 mV), may correspond to the desired air/fuel ratio, and may vary based on exhaust temperature. The exhaust air/fuel ratio may be lean when the output voltage is less than the target voltage and may be rich when the output voltage is greater than the target voltage.

The fuel mass adjustment module 204 may increase the fuel mass when the output voltage is less than the target voltage, indicating that the exhaust air/fuel ratio is lean. The fuel mass adjustment module 204 may decrease the fuel mass when the output voltage is greater than the target voltage, indicating that the exhaust air/fuel ratio is rich. The fuel mass adjustment module 204 may adjust the fuel mass by an amount that is determined based on a difference between the output voltage and the target voltage, for example, using proportional, integral, and/or derivative control.

The fuel mass adjustment module 204 may adjust the fuel mass based on the output voltage from the DO2 sensor 193-2 during catalyst light-off when the AIR system 174 and the DO2 sensor 193-2 are active. The fuel mass adjustment module 204 may determine that catalyst light-off begins when a driver starts the engine 102. The fuel mass adjustment module 204 may determine when the driver starts the engine 102 based on the driver input received from the driver input module 104. The fuel mass adjustment module 204 may determine that catalyst light-off ends when the temperature of the catalyst 176 is greater than a light-off temperature, which may be predetermined.

A temperature estimation module 206 estimates and outputs the temperature of the catalyst 176. The temperature estimation module 206 may estimate the catalyst temperature based on the intake air temperature from the IAT sensor 192 and/or the time elapsed while the engine 102 is running (i.e., the runtime of the engine 102). The temperature estimation module 206 may set the estimated catalyst temperature equal to the intake air temperature when the engine 102 is started, and increase the estimated catalyst temperature in proportion to the runtime of the engine 102. Alternatively, the fuel mass adjustment module 204 may determine that catalyst light-off ends when the runtime of the engine 102 is greater than a predetermined time (e.g., 20 seconds).

A voltage determination module 208 determines and outputs the output voltages of the DO2 sensors 193-1, 193-2. The voltage determination module 208 may determine the output voltage of the DO2 sensors 193-1, 193-2 based on signals from the DO2 sensors 193-1, 193-2. Alternatively, the voltage determination module 208 may be omitted, and the fuel mass determination and adjustment modules 202, 204 may receive the output voltages directly from the DO2 sensors 193-1, 193-2.

A sensor status module 210 determines whether the DO2 sensor 193-2 is active and outputs the determination. The sensor status module 210 may determine that the DO2 sensor 193-2 is active when the temperature of the DO2 sensor 193-2 has reached a temperature at which the DO2 sensor 193-2 is accurate. The sensor status module 210 may estimate the temperature of the DO2 sensor 193-2 based on the intake air temperature and/or the runtime of the engine 102. Alternatively, the sensor status module 210 may determine that the DO2 sensor 193-2 is active when the output voltage of the DO2 sensor 193-2 is less than a predetermined voltage (e.g., 450 mV).

An air activation module 212 outputs a signal to the AIR actuator module 178 to activate the AIR system 174 and outputs a signal to the fuel mass adjustment module 204 indicating when the AIR system 174 is activated. The air activation module 212 may activate the AIR system 174 when the engine 102 is started and when engine operating conditions are within predetermined ranges. The engine operating conditions may include the intake air temperature, the ambient air pressure, the manifold absolute pressure, the engine coolant temperature, and/or the engine speed.

The predetermined ranges for the manifold absolute pressure, the engine coolant temperature, and the engine speed may correspond to the engine 102 operating at an idle speed while warming up. For example only, the predetermined range for the manifold absolute pressure may be greater than 70 kilopascals (kPa), the predetermined range for the engine coolant temperature may be less than 100 Celsius (° C.), and the predetermined range for engine speed may be between 1,500 RPM and 2,000 RPM. The predetermined ranges for the intake air temperature and the ambient air pressure may be driven by emissions standards. For example only, the predetermined range for the intake air temperature may be between −30° C. and 30° C., and the predetermined range for the ambient air pressure may be greater than 80 kPa.

The fuel mass adjustment module 204 may determine when the DO2 sensor 193-2 is active is active based on input received from the sensor status module 210. The fuel mass adjustment module 204 may determine when the AIR system 174 is active based on input received from the air activation module 212. The AIR system 174 may inject a constant amount of air when active. Thus, adjusting the fuel mass may be the only way to adjust the air/fuel ratio of exhaust flowing through the catalyst 176.

A fuel control module 214 outputs a signal to the fuel actuator module 124 to control the fueling rate of the engine 102. The fuel control module 214 may control the fueling rate based on the fuel mass, as adjusted by the fuel mass adjustment module 204. The fuel control module 214 may output the fuel mass to the fuel actuator module 124, which may inject the fuel mass before each combustion event in the engine 102.

Figure 3:
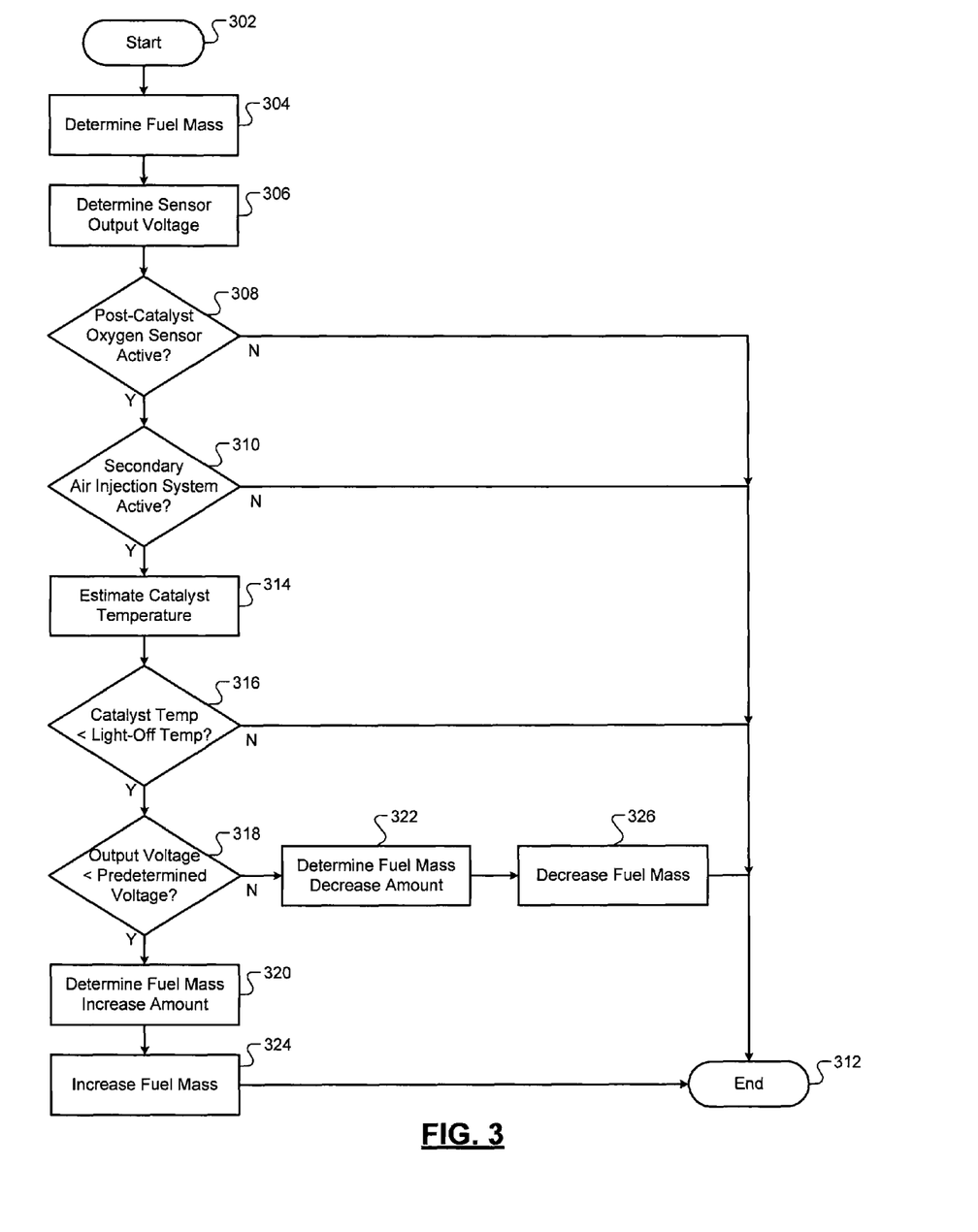
FIG. 3 is a flowchart illustrating an example engine control method according to the principles of the present disclosure.

Referring now to FIG. 3, a method for controlling an engine according to the principles of the present disclosure begins at 302. At 304, the method determines a fuel mass for injection into the engine. The method may determine the fuel mass based on airflow measured in an intake system of the engine and a desired air/fuel ratio, such as stoichiometric. At 306, the method determines an output voltage from an oxygen sensor positioned downstream from a catalyst in an exhaust system of the engine.

At 308, the method determines whether the oxygen sensor is active. If 308 is true, the method continues at 310. Otherwise, the method ends at 312. The oxygen sensor may be active when the temperature of the oxygen sensor is greater than a temperature above which the oxygen sensor accurately detects oxygen levels. The method may determine that the oxygen sensor is active when the output voltage from the oxygen sensor is less than a predetermined voltage.

At 310, the method determines whether a secondary air injection system in the exhaust system is active. If 310 is true, the method continues at 314. Otherwise, the method ends at 312. The secondary air injection system may be activated when the engine is started and engine operating conditions are within predetermined ranges. The operating conditions may include an engine speed, an engine coolant temperature, an intake air temperature, an ambient air pressure, and a manifold absolute pressure.

At 314, the method estimates the temperature of the catalyst. The method may estimate the catalyst temperature based on an ambient temperature, the intake air temperature, and/or the time elapsed while the engine is running. Alternatively, the method may estimate the catalyst temperature based on a temperature measured using a temperature sensor positioned in the exhaust system at or near the catalyst.

At 316, the method determines whether the catalyst temperature is less than a light-off temperature. The catalyst is heated to the light-off temperature when the engine is started during catalyst light-off. The catalyst may reduce emissions most effectively at or above the light-off temperature, which may be predetermined. If 316 is true, the method continues at 318. Otherwise, the method ends at 312.

At 318, the method determines whether the output voltage of the oxygen sensor is less than a target voltage. The air/fuel ratio of exhaust flowing by the oxygen sensor may be equal to a desired air/fuel ratio, such as stoichiometric, when the output voltage is equal to the target voltage. If 318 is true, the method continues at 320. Otherwise, the method continues at 322.

At 320, the method determines an amount by which to increase the fuel mass injected into the engine. The method may determine this amount based on a difference between the output voltage and the target voltage, for example, using proportional, integral, and/or derivative control. If the method determines this amount using derivative control, the method may limit the derivative value to avoid decreasing the fuel mass. Thus, the method may increase this amount as the difference between the output voltage and the target voltage increases. Conversely, the method may decrease this amount as the difference between the output voltage and the target voltage decreases. At 324, the method increases the fuel mass by the amount determined at 320.

At 322, the method determines an amount by which to decrease the fuel mass injected into the engine. The method may determine this amount based on a difference between the output voltage and the target voltage, for example, using proportional, integral, and/or derivative control. If the method determines this amount using derivative control, the method may limit the derivative value to avoid increasing the fuel mass. Thus, the method may increase this amount as the difference between the output voltage and the target voltage increases. Conversely, the method may decrease this amount as the difference between the output voltage and the target voltage decreases. At 326, the method decreases the fuel mass by the amount determined at 322.

Figure 4:
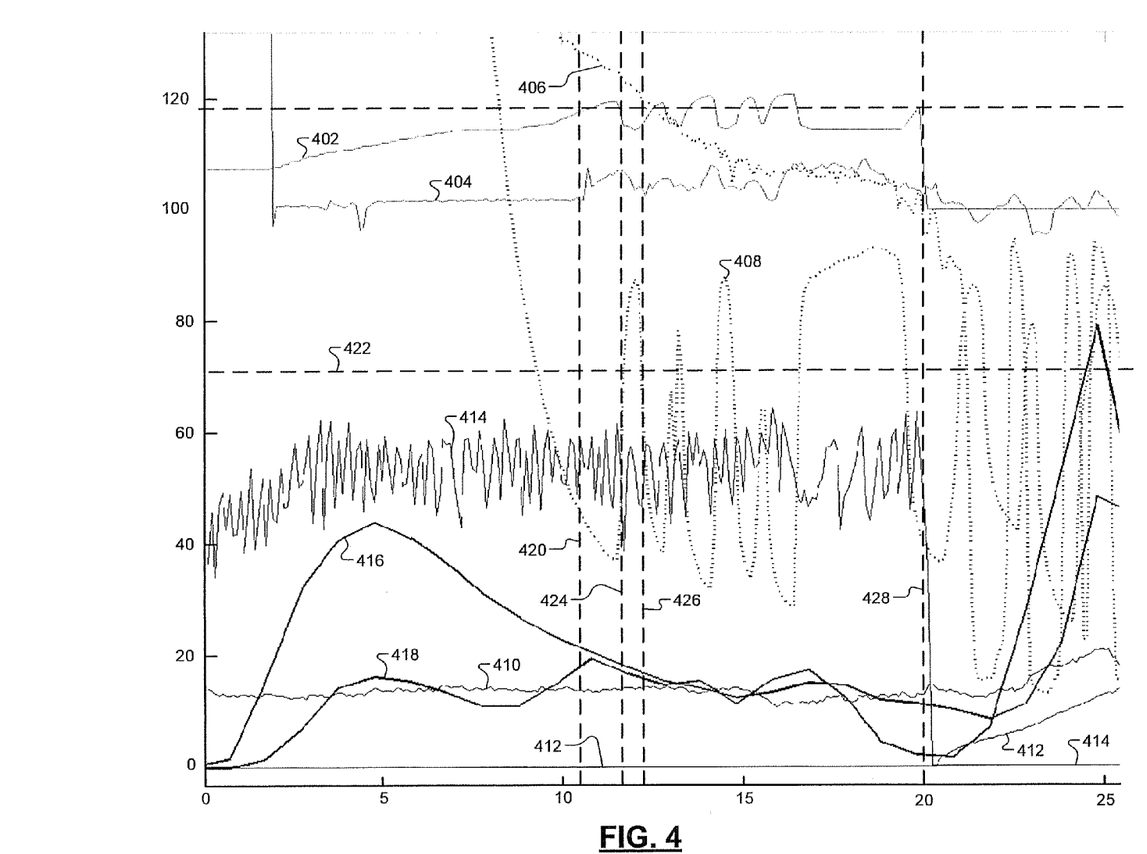
FIG. 4 is a graph illustrating example engine control signals according to the principles of the present disclosure.

Referring now to FIG. 4, a control signal and sensor signals according to the principles of the present disclosure are illustrated. The control signal includes a commanded equivalence ratio 402. The sensor signals include a measured equivalence ratio 404, a pre-catalyst oxygen sensor output voltage 406, a post-catalyst oxygen sensor output voltage 408, an engine speed 410, a vehicle speed 412, and a secondary air injection system airflow 414. The sensor signals also include a flame ionizer detector weighted mass 416 and a nitrogen oxide detector weighted mass 418. The ionizer detector weighted mass 416 indicates hydrocarbon emission levels, and the nitrogen oxide detector weighted mass 418 indicates nitrogen oxide emission levels.

The x-axis represents engine run-time in seconds, and the y-axis represents various units. The control signals and the sensor signals have been scaled to fit the y-axis. The commanded equivalence ratio 402 and the measured equivalence ratio 404 have been multiplied by 100. The pre-catalyst oxygen sensor output voltage 406 and the post-catalyst oxygen sensor output voltage 408, originally in millivolts (mV), have been multiplied by 0.1. The engine speed 410, originally in revolutions per minute (RPM), has been multiplied by 0.01. The vehicle speed 412 has been multiplied by 0.62137 and the secondary air injection system airflow 414 has been multiplied by 10. The emissions-related weighted masses 416, 418 have been multiplied by 1,000,000.

Between 0 seconds and about 21 seconds of engine runtime, the control signals and sensor signals correspond to engine operating conditions when an engine is started and is warming up at an idle speed. At about 21 seconds, the engine speed 410 and the vehicle speed 412 start to increase, indicating that the driver has tipped into an accelerator pedal for a first time after the engine was started. A control system and method according to the principles of the present disclosure may adjust the commanded equivalence ratio 402 based on the post-catalyst oxygen sensor output voltage 408 before the first tip-in to optimize the amount of oxygen stored on a catalyst. In turn, the catalyst can both store and release oxygen, which reduces emissions at the first tip-in.

At 420, the post-catalyst oxygen sensor output voltage 408 is about 420 mV, indicating that the post-catalyst oxygen sensor output voltage 408 accurately indicates oxygen levels of exhaust at or near the catalyst. Thus, starting at 420, the commanded equivalence ratio 402 is adjusted in response to changes in the post-catalyst oxygen sensor output voltage 408 to optimize the amount of oxygen stored on the catalyst.

The commanded equivalence ratio 402 is adjusted to maintain the post-catalyst oxygen sensor output voltage 408 at a target voltage 422 of about 720 mV, which may correspond to a desired air/fuel ratio at the catalyst, such as stoichiometric. At 424, the post-catalyst oxygen sensor output voltage 408 transitions from less than the target voltage 422 to greater than target voltage 422, which may indicate that exhaust at the catalyst has transitioned from lean to rich. Although the measured equivalence ratio 404 is greater than 100 prior to 424, the measured equivalence ratio 404 is taken at the engine and therefore indicates that the air/fuel ratio at the engine, but not necessarily at the catalyst, is rich prior to 424.

At 424, in response to the change in the post-catalyst oxygen sensor output voltage 408, the commanded equivalence ratio 402 is decreased to decrease the air/fuel ratio at the catalyst. At 426, the post-catalyst oxygen sensor output voltage 408 transitions from greater than the target voltage 422 to less than the target voltage 422, which may indicate that exhaust at the catalyst has transitioned from rich to lean. In response, at 426, the commanded equivalence ratio 402 is increased to increase the air/fuel ratio at the catalyst. The commanded equivalence ratio 402 may be adjusted in this manner as long as engine operating conditions, such as the engine speed 410, indicate that the engine is still at idle speed and the driver has not tipped in.

At 428, the engine runtime is equal to 20 seconds, which may indicate that the pre-catalyst oxygen sensor output voltage 406 accurately indicates oxygen levels of exhaust exiting the engine. Thus, starting at 428, the commanded equivalence ratio 402 may be controlled based on the pre-catalyst oxygen sensor output voltage 406 instead of or in addition to the post-catalyst oxygen sensor output voltage 408.

Figure 5:
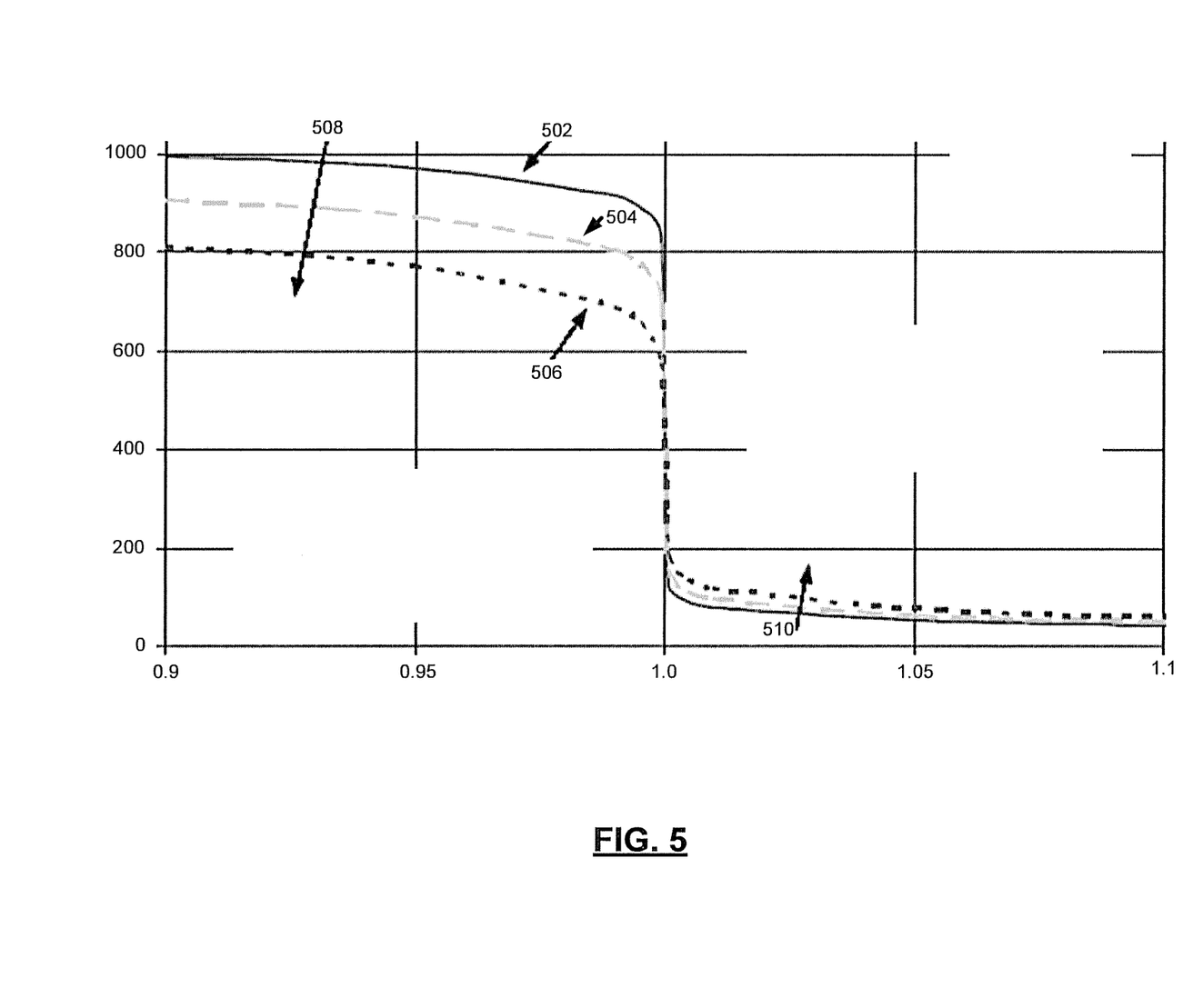
FIG. 5 is a graph illustrating example output of an oxygen sensor positioned downstream from a catalyst according to the principles of the present disclosure.

Referring now to FIG. 5, relationships between output from an oxygen sensor and an air/fuel ratio of exhaust flowing past the oxygen sensor are illustrated. The oxygen sensor is a narrow-band or switching sensor. The y-axis represents the output voltage of the switching sensor in millivolts (mV), and the x-axis represents the lambda, or the inverse of the equivalence ratio, of the exhaust flowing past the switching sensor.

A first output voltage 502 shows the relationship between the output voltage of the switching sensor and the lambda of the exhaust when the temperature of the switching sensor is 500 degrees Celsius (° C.). A second output voltage 504 shows the relationship between the output voltage of the switching sensor and the lambda of the exhaust when the temperature of the switching sensor is 700° C. A third output voltage 506 shows the relationship between the output voltage of the switching sensor and the lambda of the exhaust when the temperature of the switching sensor is 900° C.

A control system and method according to the principles of the present disclosure may adjust the amount of fuel delivered to an engine based relationships such as those shown by the first, second, and third output voltages 502, 504, and 506. Fuel delivered to the engine may be decreased when the output voltage is greater than a target voltage. Fuel delivered to the engine may be increased when the output voltage is greater than the target voltage. Fuel may be adjusted by an amount that is proportional to a difference between the output voltage and the target voltage.

As shown at 508, the output voltage of the switching sensor decreases as the temperature of exhaust at or near the switching sensor increases. As shown at 510, the output voltage of the switching sensor decreases as the exhaust temperature increases. Thus, the target voltage may be adjusted based on the exhaust temperature.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a voltage determination module that determines a first output voltage of a first oxygen sensor positioned upstream from a catalyst in an exhaust system of an engine, and that determines a second output voltage of a second oxygen sensor positioned downstream from the catalyst, the first output voltage indicating a first oxygen level of exhaust upstream from the catalyst, the second output voltage indicating a second oxygen level of exhaust downstream from the catalyst; and
   a fuel control module that controls a fuel mass injected into the engine based on the first output voltage and the second output voltage when a temperature of the catalyst is greater than a light-off temperature, and that controls the fuel mass based on the second output voltage and independent from the first output voltage when the catalyst temperature is less than the light-off temperature.

2. The system of claim 1, wherein the second oxygen sensor is a narrow band sensor.

3. The system of claim 1, further comprising a temperature estimation module that estimates the catalyst temperature based on time elapsed while the engine is running.

4. The system of claim 1, further comprising a fuel mass determination module that determines the fuel mass based on a desired air/fuel ratio and measured intake airflow.

5. The system of claim 4, further comprising a fuel mass adjustment module that increases the fuel mass when the output voltage is less than a target voltage and decreases the fuel mass when the output voltage is greater than the target voltage.

6. The system of claim 5, wherein the fuel mass adjustment module adjusts the fuel mass by an amount that is determined based on a difference between the output voltage and the target voltage.

7. The system of claim 1, further comprising an air activation module that activates a secondary air injection system in the exhaust system, wherein the fuel control module controls the fuel mass injected into the engine based on the output voltage when the secondary air injection system is active.

8. The system of claim 7, wherein the air activation module activates the secondary air injection system based on an engine speed, an engine coolant temperature, an intake air temperature, an ambient air pressure, and a manifold absolute pressure.

9. The system of claim 1, further comprising a sensor status module that determines whether the oxygen sensor is active, wherein the fuel control module controls the fuel mass injected into the engine based on the output voltage when the oxygen sensor is active.

10. The system of claim 9, wherein the sensor status module determines that the oxygen sensor is active when the output voltage is less than a predetermined voltage.

11. A method comprising:
- determining a first output voltage of a first oxygen sensor positioned upstream from a catalyst in an exhaust system of an engine, the first output voltage indicating a first oxygen level of exhaust upstream from the catalyst;
- determining a second output voltage of a second oxygen sensor positioned downstream from the catalyst, the second output voltage indicating a second oxygen level of exhaust downstream from the catalyst;
- controlling a fuel mass injected into the engine based on the first output voltage and the second output voltage when a temperature of the catalyst is greater than a light-off temperature; and
- controlling the fuel mass based on the second output voltage and independent from the first output voltage when the catalyst temperature is less than the light-off temperature.

12. The method of claim 11, wherein the second oxygen sensor is a narrow band sensor.

13. The method of claim 11, further comprising estimating the catalyst temperature based on time elapsed while the engine is running.

14. The method of claim 11, further comprising determining the fuel mass based on a desired air/fuel ratio and measured intake airflow.

15. The method of claim 14, further comprising increasing the fuel mass when the output voltage is less than a target voltage and decreasing the fuel mass when the output voltage is greater than the target voltage.

16. The method of claim 15, further comprising adjusting the fuel mass by an amount that is determined based on a difference between the output voltage and the target voltage.

17. The method of claim 11, further comprising activating a secondary air injection system in the exhaust system and controlling the fuel mass injected into the engine based on the output voltage when the secondary air injection system is active.

18. The method of claim 17, further comprising activating the secondary air injection system based on an engine speed, an engine coolant temperature, an intake air temperature, an ambient air pressure, and a manifold absolute pressure.

19. The method of claim 11, further comprising determining whether the oxygen sensor is active, and controlling the fuel mass injected into the engine based on the output voltage when the oxygen sensor is active.

20. The method of claim 19, further comprising determining that the oxygen sensor is active when the output voltage is less than a predetermined voltage.

* * * * *